United States Patent
Gomi et al.

(10) Patent No.: US 9,262,289 B2
(45) Date of Patent: Feb. 16, 2016

(54) STORAGE APPARATUS AND FAILOVER METHOD

(71) Applicant: Hitachi, Ltd., Tokyo (JP)

(72) Inventors: Shinki Gomi, Tokyo (JP); Nobuyuki Saika, Tokyo (JP)

(73) Assignee: HITACHI, LTD., Tokyo (JP)

( * ) Notice: Subject to any disclaimer, the term of this patent is extended or adjusted under 35 U.S.C. 154(b) by 37 days.

(21) Appl. No.: 14/371,147

(22) PCT Filed: Oct. 11, 2013

(86) PCT No.: PCT/JP2013/077783
§ 371 (c)(1),
(2) Date: Jul. 8, 2014

(87) PCT Pub. No.: WO2015/052836
PCT Pub. Date: Apr. 16, 2015

(65) Prior Publication Data
US 2015/0301913 A1 Oct. 22, 2015

(51) Int. Cl.
*G06F 11/00* (2006.01)
*G06F 11/20* (2006.01)

(52) U.S. Cl.
CPC ...... *G06F 11/2094* (2013.01); *G06F 2201/815* (2013.01)

(58) Field of Classification Search
CPC .................. G06F 11/2094; G06F 2201/815
See application file for complete search history.

(56) References Cited

U.S. PATENT DOCUMENTS

| | | | | |
|---|---|---|---|---|
| 7,937,616 B2 * | 5/2011 | Armstrong | .......... | G06F 11/2046 714/10 |
| 8,041,986 B2 * | 10/2011 | Hatasaki | ............. | G06F 11/2028 714/10 |
| 8,868,968 B2 * | 10/2014 | Sekiguchi | ........... | G06F 11/0712 714/6.12 |
| 2004/0153740 A1 | 8/2004 | Fujimoto | | |
| 2005/0198636 A1 * | 9/2005 | Barsness | ............... | G06F 9/4881 718/100 |
| 2005/0240932 A1 * | 10/2005 | Billau | .................. | G06F 9/5072 718/104 |
| 2007/0180314 A1 | 8/2007 | Kawashima et al. | | |
| 2007/0234115 A1 | 10/2007 | Saika | | |
| 2008/0162983 A1 * | 7/2008 | Baba | ................... | G06F 11/0712 714/3 |
| 2008/0301487 A1 | 12/2008 | Hatta et al. | | |
| 2009/0307436 A1 * | 12/2009 | Larson | ................ | G06F 11/0712 711/148 |
| 2010/0064165 A1 * | 3/2010 | Kambara | ............ | G06F 11/2025 714/4.1 |

(Continued)

FOREIGN PATENT DOCUMENTS

| | | | |
|---|---|---|---|
| JP | 2004-021608 A | 1/2004 | |
| JP | 2004-234558 A | 8/2004 | |

(Continued)

*Primary Examiner* — Joshua P Lottich
(74) *Attorney, Agent, or Firm* — Volpe and Koenig, P.C.

(57) ABSTRACT

A storage apparatus is provided with a virtualization mechanism which manages first and second LPARs (logical partitions) assigned respectively with first and second logical resources acquired by logically partitioning physical resources in the storage apparatus. The virtualization mechanism provides a shared memory area which is an area based on a memory and can be accessed by the first and second LPARs. The first LPAR stores information required for taking over a data input/output process handled by the first LPAR to the second LPAR, in the shared memory area. When detecting that a fault occurs in the first LPAR, the second LPAR acquires the information required for taking over from the shared memory area and takes over and executes the data input/output process formerly handled by the first LPAR on the basis of the information required for taking over.

11 Claims, 14 Drawing Sheets

(56) References Cited

U.S. PATENT DOCUMENTS

| | | | |
|---|---|---|---|
| 2011/0154133 A1* | 6/2011 | Ganti | G06F 11/0712 |
| | | | 714/54 |
| 2013/0047153 A1 | 2/2013 | Emaru | |
| 2013/0091335 A1* | 4/2013 | Mulcahy | G06F 11/2038 |
| | | | 711/163 |
| 2013/0268800 A1* | 10/2013 | Rangaiah | G06F 11/2033 |
| | | | 714/4.11 |
| 2013/0332696 A1* | 12/2013 | Schmidt | G06F 9/5077 |
| | | | 711/173 |

FOREIGN PATENT DOCUMENTS

| | | |
|---|---|---|
| JP | 2007-207219 A | 8/2007 |
| JP | 2007-279890 A | 10/2007 |
| JP | 2008-242742 A | 10/2008 |
| JP | 2012-195005 A | 10/2012 |
| JP | 2013-045444 A | 3/2013 |

* cited by examiner

Fig. 3

| | Item name | Value | | |
|---|---|---|---|---|
| 100a | Item name | Value | | |
| 100b | Counterpart node name | LPAR 2 (or LPAR 1) | | |
| 100c | Monitoring interval | 10[s] | | |
| | Number of resource groups | N | | |
| 100d | Resource group 1 | IP address | 192.168.10.20 | |
| | | Number of FS | 3 | |
| | | FS name | FS 1 | |
| | | FS name | FS 2 | |
| | | FS name | FS 3 | |
| 100e | Resource group 2 | : | : | : |
| | : | : | : | : |

Table 100

Fig. 4

| | Item name | Value | | |
|---|---|---|---|---|
| 110a | NFS configuration information | IP address at which information is published : | Name of published directory : | Right to access : |
| 110b | CIFS configuration information | IP address at which information is published : | Name of published directory : | Right to access : |
| 110c | Lock information | File name : | IP address (lock owner) : | |

Table 110

Fig. 5

| | Item name | Value |
|---|---|---|
| 120a | Counter 1 (LPAR 1) | 10 |
| 120b | Counter 2 (LPAR 2) | 3 |
| 120c | Fault flag | ON |

Table 130

STORAGE APPARATUS AND FAILOVER METHOD

TECHNICAL FIELD

The present invention relates to a failover among a plurality of logical partitions (LPARs).

BACKGROUND ART

An element that configures a network is generally known as a node, and a cluster into which a plurality of nodes (for example, server machines) are interconnected is known. Here, the cluster indicates a system that behaves as if it is overall a single node (apparatus) in regard to an external apparatus. Generally, if any one node within a cluster develops a fault, a failover is executed, in which another node takes over its processing and data.

A known technology for use even when failovers occur includes, for example, a technology of matching transactions, while at the same time limiting deterioration in disk I/O performance (see, for example, PTL 1). Additionally, a technology that enables the replacement of individual LPARs by configuring a replacement destination LPAR on another physical computer if a fault has occurred in an LPAR on a physical computer is also known (see, for example, PTL 2).

CITATION LIST

Patent Literature

[PTL 1] Japanese Unexamined Patent Application Publication No. 2008-242742
[PTL 2]: Japanese Unexamined Patent Application Publication No. 2012-195005

SUMMARY OF INVENTION

Technical Problem

In a storage apparatus capable of executing a plurality of LPARs, it is preferable to fail over swiftly to another LPAR when a fault has occurred in any one LPAR.

Solution to Problem

The storage apparatus is provided with a virtualization mechanism configured to manage first and second LPARs (logical partitions) assigned respectively with first and second logical resources acquired by logically partitioning physical resources in the storage apparatus. The virtualization mechanism provides a shared memory area which is an area based on a memory and can be accessed by the first and second LPARs. The first LPAR stores information required for taking over a data input/output process handled by the first LPAR to the second LPAR, in the shared memory area. When detecting that a fault occurs in the first LPAR, the second LPAR acquires the information required for taking over from the shared memory area and takes over and executes the data input/output process formerly handled by the first LPAR on the basis of the information required for taking over.

Advantageous Effects of Invention

The present invention makes possible the swift execution of a failover between LPARs.

BRIEF DESCRIPTION OF DRAWINGS

FIG. 3 is a configuration diagram of one example of a cluster configuration management table.
FIG. 4 is a configuration diagram of one example of a takeover information management table.
FIG. 5 is a configuration diagram of one example of a fault monitoring management table.

DESCRIPTION OF EMBODIMENTS

The following describes one embodiment in reference to the drawings.

In the following description, expressions such as "aaa table" are in some cases used to describe information, but this information may be expressed in formats other than tables or other data structures. In order indicate that such information is not dependent on data structures, "aaa table", etc., may be referred to as "aaa information".

Additionally, in the following description, processes in which the "program" is the subject are described in some cases, but since the program is operated by a processor (for example, a CPU (Central Processing Unit)), and the specified processes are executed using an appropriate storage resource (for example, memory) and/or communications interface, the subject of the process may equally be the "processor". Additionally, the processor may include a hardware circuit that implements part or all of the process. The computer program may be installed from the program source to the computer. The program source may, for example, be a program distribution server or a computer-readable storage media.

Furthermore, in some cases in the following description, where like elements are described without differentiation, reference symbols are used, and where like elements are described with differentiation, in place of the reference symbols, the elements are assigned identification numbers.

In addition to this, the meanings of terms used in the following description are as follows:

(*) "LPAR" is the abbreviation for logical partition (Logical Partition), which is a virtual machine to which a logical resource, acquired by logically partitioning physical resources, has been assigned. The LPAR is recognized as a single piece of apparatus by an external apparatus (for example, the client).

(*) "Hypervisor" is a type of virtualization mechanism that creates and operates LPARs.

(*) "Node" means an element that configures a network. In the present embodiment, the node is the LPAR which is the cluster configuration element.

(*) "Cluster" is a system configured from a plurality of nodes, which behaves as if it is overall a single node (apparatus) in regard to an external apparatus (for example, a client).

(*) "Failover" means a second apparatus taking over processes and data in the case of a fault occurring in a first apparatus, or the function thereof. The first apparatus and second apparatus may, respectively, be either physical or logical apparatus. In the present embodiment, both the first and second apparatus are LPARs.

Figure 20:
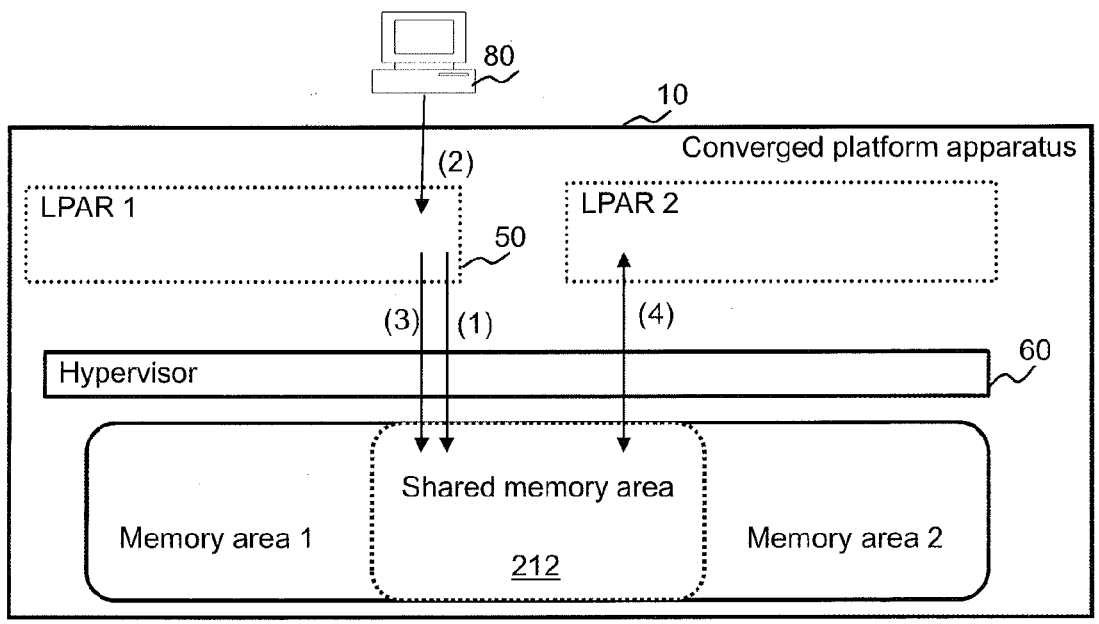
FIG. 20 depicts a summary of a computer system.

Firstly, in reference to FIG. 20, an outline of a computer system relating to an embodiment is described.

The computer system is provided with a converged platform apparatus 10 which is one example of a storage apparatus and is coupled to a client 80. A plurality of LPARs 50 created by a hypervisor 60, operate on the converged platform apparatus 10. The hypervisor 60 manages a plurality of logical resources acquired by logically partitioning physical resources including a memory, and the LPARs to which each of the plurality of logical resources is assigned. The LPARs 50 include LPARs 1 and 2. Logically partitioning the memory provides a memory area 1, a memory area 2, and a shared memory area 212 as a logical resource. The memory area 1 is assigned to the LPAR 1, and the memory area 2 is assigned to the LPAR 2. Furthermore, a shared memory area which can be accessed by both of the LPARs 1 and 2, is assigned to the LPARs 1 and 2.

The LPAR 1 stores information required for taking over, required for the LPAR 2 to take over the operation of the LPAR 1, in the shared memory area 212

(FIG. 20(1)). Here, the information required for taking over comprises, for example, information relating to the resource group for the LPAR 1, configuration information for the file system, and information relating to file locks in the file system (lock information). The LPAR 1 reflects the lock information for the file that is the subject of the access request in takeover information in the shared memory area 212 (FIG. 20(3)) in cases where receiving an access request for a file from the client 80 (FIG. 20(2)). If the LPAR 2 recognizes that a fault has occurred in the LPAR 1, the LPAR 2 acquires the information required for taking over from the shared memory area 212, and implements the various configurations, etc., on the basis of the information required for taking over. In this way, the LPAR 2 takes over and executes the processes of the LPAR 1. According to the present embodiment, since, in this way, information required for taking over can be acquired from the shared memory area 212, a swift failover is possible if a fault has occurred in the LPAR 1.

The following is a detailed description of the embodiment.

Figure 1:
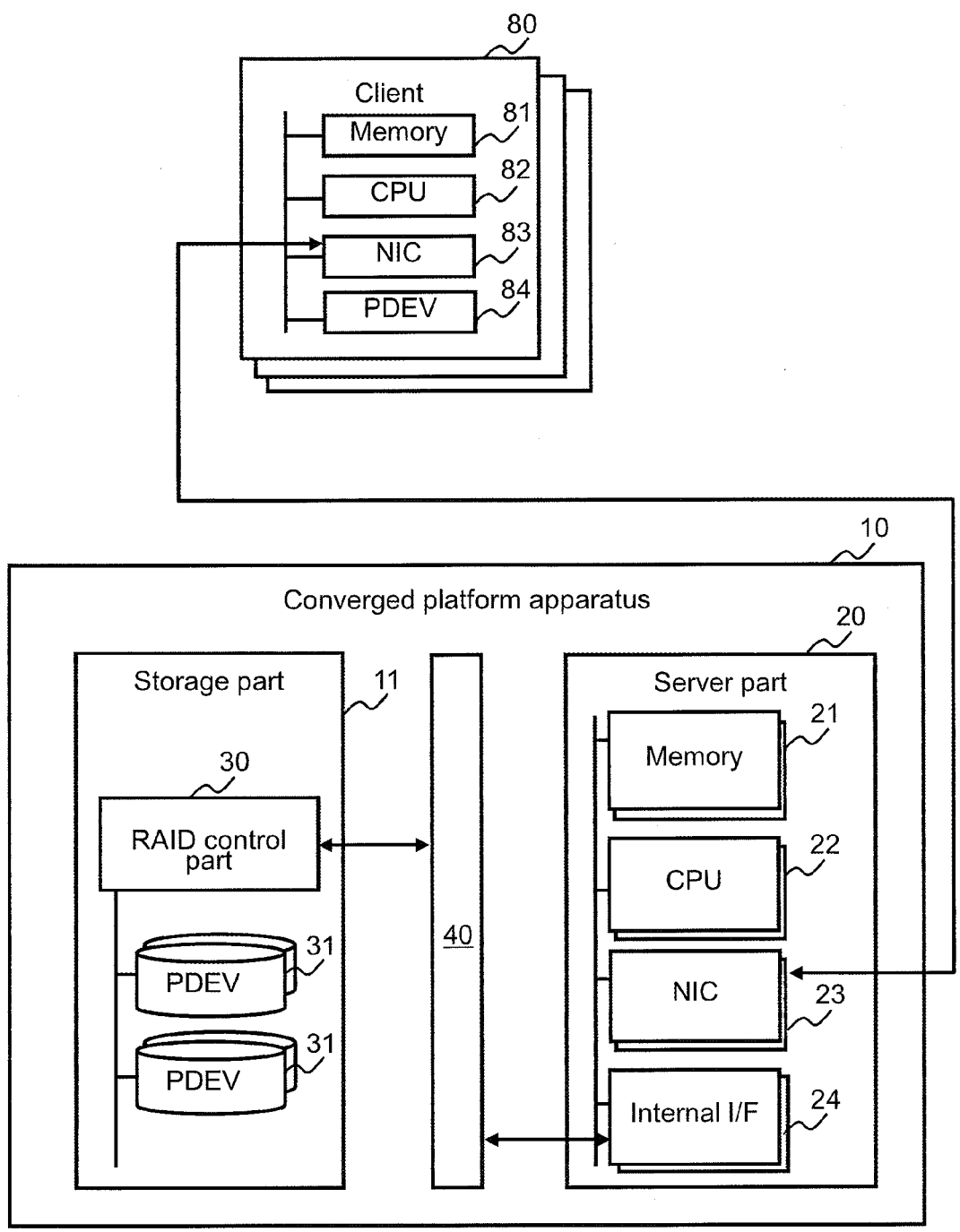
FIG. 1 is a configuration diagram of a computer system.

FIG. 1 is a configuration diagram of the computer system.

The computer system is provided with a plurality of (or single) client(s) 80 and the converged platform apparatus 10 to which the plurality of clients 80 are coupled. The client 80 and the converged platform apparatus 10 are coupled by a communications network such as a TCP/IP network.

The client 80 is one example of a host apparatus, and is a computer that executes data access (read/write) for individual files in the converged platform apparatus 10. Specifically, the client 80 issues a file access request (file read request or write request) to the converged platform apparatus 10.

The client 80 is provided with a memory 81, a NIC (Network Interface card) 83, a physical storage device (hereinafter, PDEV) 84, and a CPU 82 to which the memory 81, the NIC 83, and the PDEV 84 are coupled. The memory 81 stores the programs and data used by the CPU 82. The CPU 82 executes the various processes by running the programs stored in the memory 81. The NIC 83 is one example of a communications interface device used in coupling to another apparatus (for example, the converged platform apparatus 10). The PDEV 84 is a non-volatile storage device such as an HDD (Hard Disk Drive) or SSD (Solid State Drive). The PDEV 84 may store programs, etc., used to control the client 80, such as the OS (Operating System) executed by the CPU 82.

The converged platform apparatus 10 is provided with a server part 20 and a storage part 11. The server part 20 and the storage part 11 are coupled through an internal data bus (for example, PCIe bus) 40.

The server part 20 may be a circuit base board (for example, a blade server). The server part 20 is provided with a memory 21, a NIC 23, an internal I/F 24, and a CPU 22 to which the memory 21, the NIC 23, and the internal I/F 24 are coupled. The memory 21 may, for example, be DRAM (Dynamic Random Access Memory), which stores the various programs and data executed by the CPU 22. The CPU 22 executes the various processes by running various programs stored in the memory 21. The NIC 23 is an example of a communications interface device used in coupling with another apparatus (for example, the client 80). The server part 20 runs one or a plurality of OSs, provides file server functions, and executes applications. The internal I/F 24 is one example of a communications interface device used to communicate via the internal data bus 40. The server part 20 receives a file access request from the client 80, and sends, to the storage part 11, a block I/O request (I/O request for the data block to configure the file to be accessed) based on this access request.

The storage part 11 is provided with a plurality of PDEVs 31, and a RAID (Redundant Array of Independent (or Inexpensive) Disks) control part 30 which is coupled to the plurality of PDEVs 31. A RAID group may also be configured from two or more PDEVs 31. An LU (Logical Unit) is configured on the basis of the RAID group. The RAID control part 30 is the module that controls access to the PDEV 31 (for example, a circuit board), and may be provided with a communications interface device, for the purpose of communicating via the internal data bus 40, a memory, and a CPU to which the interface device, the data bus 40, and the memory are coupled. The RAID control part 30 receives a block level I/O request from the server part 20 and executes the I/O process (read process/write process) in regard to the PDEV 31, in line with the I/O request.

Figure 2:
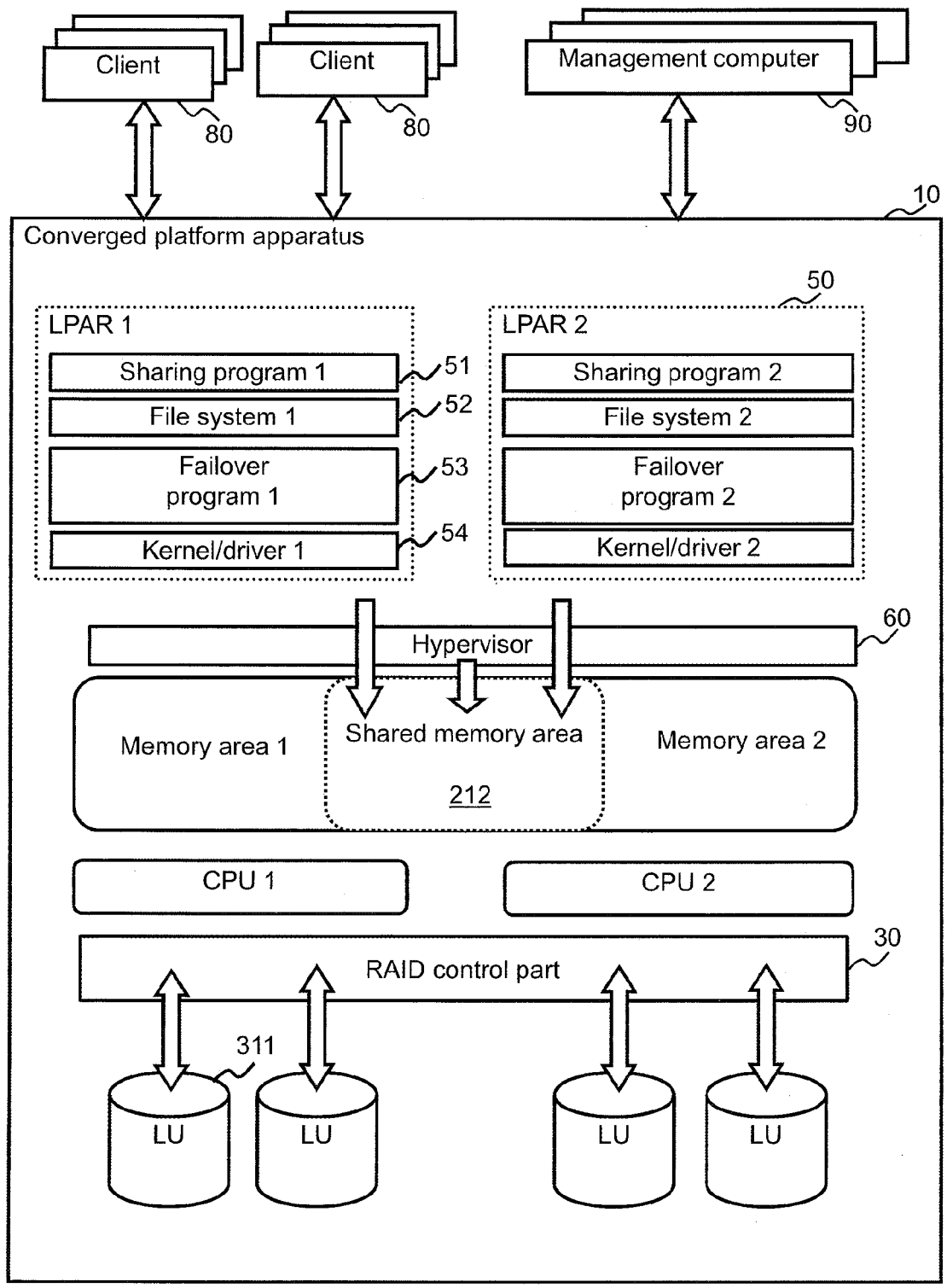
FIG. 2 is a configuration diagram of a computer system, including its software.

FIG. 2 is a configuration diagram of the computer system, including the software.

The converged platform apparatus 10 is coupled to a management computer 90, in addition to the client 80. The management computer 90 is the computer used by the administrator of the computer system to manage the computer system, which may, for example, receive various indications from the administrator and transmit them to the converged platform apparatus 10.

The hypervisor 60 on the memory 21 is executed by the CPU 22 in the converged platform apparatus 10. The hypervisor 60 manages the logical resources acquired by logically partitioning the physical resources of the converged platform apparatus 10 (the memory 21, the CPU 22, and the NIC 23, etc.). The hypervisor 60 creates the LPAR 50 to which the logical resource is assigned. The OS may be operated by each LPAR 50. The hypervisor 60 creates the memory area 1 for use by the LPAR 1, the memory area 2 for use by the LPAR 2, and the shared memory area 212 for the LPARs 1 and 2, by logically partitioning the memory 21. A cluster configuration management table 100 (see FIG. 3), a takeover information management table 110 (see FIG. 4), and a fault monitoring management table 130 (see FIG. 5), described below, may, for example, be managed in the shared memory area 212.

Logically partitioning the CPU 22 provides a CPU 1 and a CPU 2 as logical resources. The CPU 1 is the CPU for the LPAR 1 (the logical resource assigned to the LPAR 1), and the CPU 2 is the CPU for the LPAR 2.

The LPAR 50 operates a file sharing program 51, a file system 52, a failover program 53, and a kernel/driver 54.

The file sharing program 51 uses a communications protocol such as a CIFS (Common Internet File System) or an NFS (Network File System) to provide a file sharing service that allows file sharing among a plurality of clients.

The file system 52 includes a logical structure configured to realize management units known as files on an LU 311. In the present embodiment, the file system 52 includes a file system program to manage the logical structure. The file system 52 includes, as its logical structure, a superblock, an Mode management table, and data blocks. The superblock, mode management table, and data block are well known and as such only a brief description is given herein. The superblock holds the overall file system information. For example, the superblock holds management information for the file system as a whole, including the size of the file system, the free space within the file system, etc. The Mode management table manages metainformation for individual files/directories. The Mode management table also manages the addresses of files in the data block. Note that the structure of the file system 52 is stored in the LU 311, and part or all of the structure is called to the LPAR memory area.

The failover program 53 monitors faults occurring in other LPARs 50 in the same cluster, and when it detects a fault, it takes over the resources (IP address, file system, etc.) operating on the LPAR 50 where the fault originated, and implements a failover that reopens the file sharing service that was being run by the LPAR 50 where the fault originated.

The kernel/driver 54 is a program that provides overall control, for example, controlling the schedule of a plurality of programs (processes) being operated on the converged platform apparatus 10, and handling interruptions from hardware, as well as control unique to the hardware.

The RAID control part 30 executes the input/output process in regard to the LU 311 based on the RAID group.

As shown in FIG. 2, the program executed by LAPR n (where n=1 or 2) and the logical resource assigned to the LPAR n are assigned the same number as the LPAR. In order to avoid overly lengthy description, hereinafter, the number n is, in some cases, used in place of the reference symbol to refer to a program executed by the LPAR n or a logical resource assigned to the LPAR n.

FIG. 3 is a configuration diagram of one example of the cluster configuration management table.

The cluster configuration management table 100 contains fields for a counterpart node name 100a, a monitoring interval 100b, a number of resource groups 100c, and a resource group 100d.

The name of the counterpart node (LPAR) that makes up the cluster configuration is stored under the counterpart node name 100a. The time interval for implementation of fault monitoring is stored under the monitoring interval 100b. The number of resource groups into which the resources required to provide the LPAR file sharing service are divided is stored under the number of resource groups 100c. The number of resource groups 100d is equal to or greater than the number configured in the number of resource groups 100c. Information relating to the resource group (resource group information), for example, the IP address used to access the resource group by the client 80, the number of file systems attached to the resource group, and the name of each of the file systems attached to the resource group are stored under the resource group 100d.

FIG. 4 is a configuration diagram of one example of the takeover information management table.

The takeover information management table 110 contains fields for NFS configuration information 110a, CIFS configuration information 110b, and lock information 110c.

The IP address at which information is published, the name of the published directory, and the right to access are stored in the NFS configuration information 110a and the CIFS configuration information 110b, respectively. The IP address at which the information is published is the IP address of the computer (client, etc.) publishing the file system. The name of the published directory is the name of the directory being published. The published directory may be a directory within the file system, the root directory of the file system, or the root directory of the global namespace. The right to access indicates the type of access permitted to the site on which the information is published. Types of the right to access include read-only permission and read/write permission, etc.

The file name and IP address are stored in the lock information 110c. The file name is the name of the file being locked. The IP address is the IP address of the computer locking the file with the file name (the lock owner).

In the description of the present embodiment, all the information stored in the cluster configuration management table 100 is at times referred to as "cluster configuration information", and all the information stored in the takeover information management table 110 is at times referred to as "takeover information". The information configured in the cluster configuration management table 100 and the takeover information management table 110 are one example of the information required for taking over.

FIG. 5 is a configuration diagram of one example of the fault monitoring management table.

A fault monitoring management table 120 contains fields for a counter 1 120a, a counter 2 120b, and a fault flag 120c. The count value counted up by the LPAR 1 is stored under the counter 1 120a. The count value counted up by the LPAR 2 is stored under the counter 2 120b. The count value may be updated using a separate method, for example, counting down instead of counting up. The count value is one example of confirmation information. The flag (fault flag) that indicates whether or not a fault has occurred in the LPAR is stored under the fault flag 120c. The fault flag is configured to come ON when the hypervisor 60 detects a fault in the LPAR.

The following is a description of the process implemented in the present embodiment.

Figure 6:
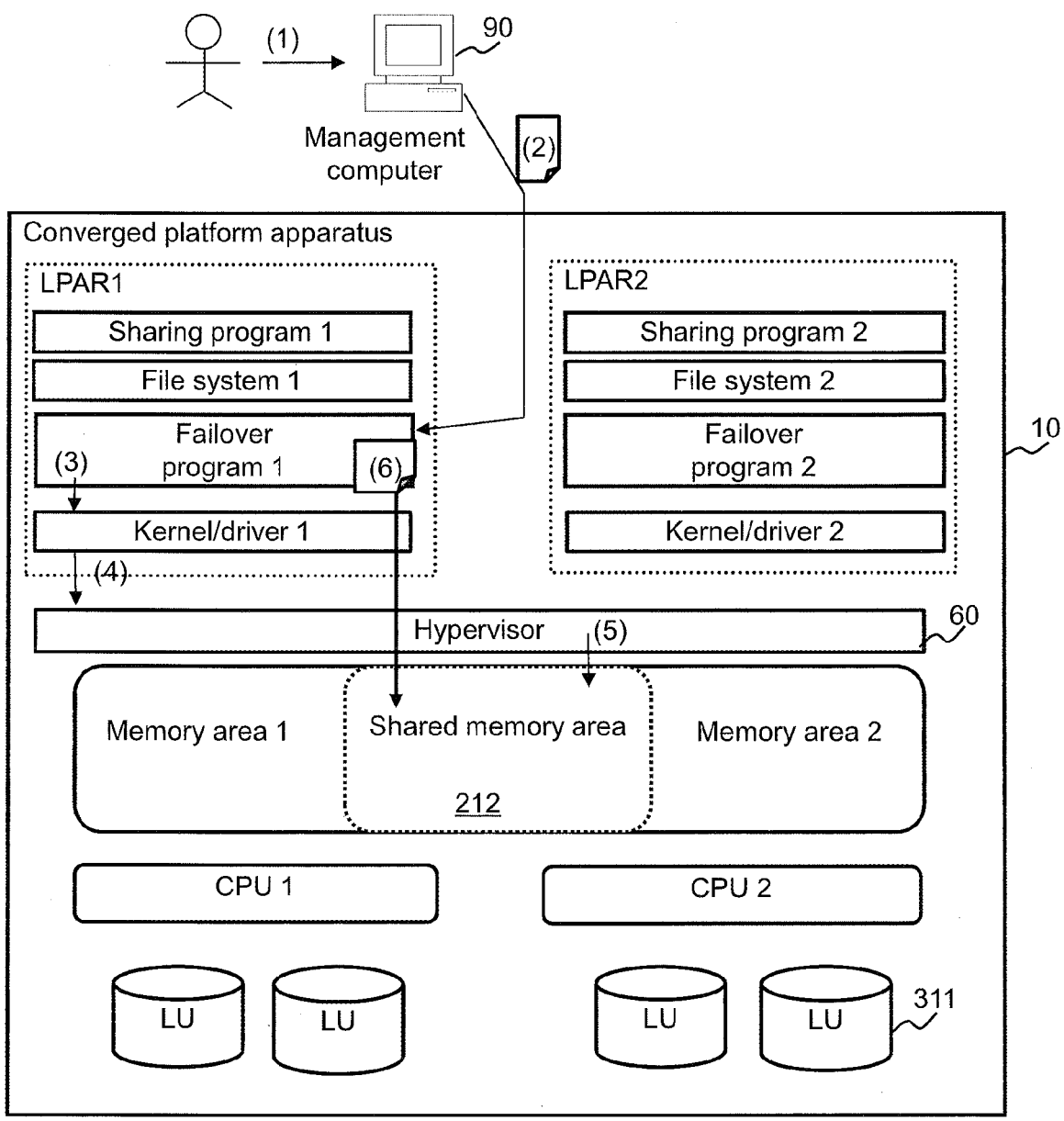
FIG. 6 is a pattern diagram depicting an initial process.
Figure 11:
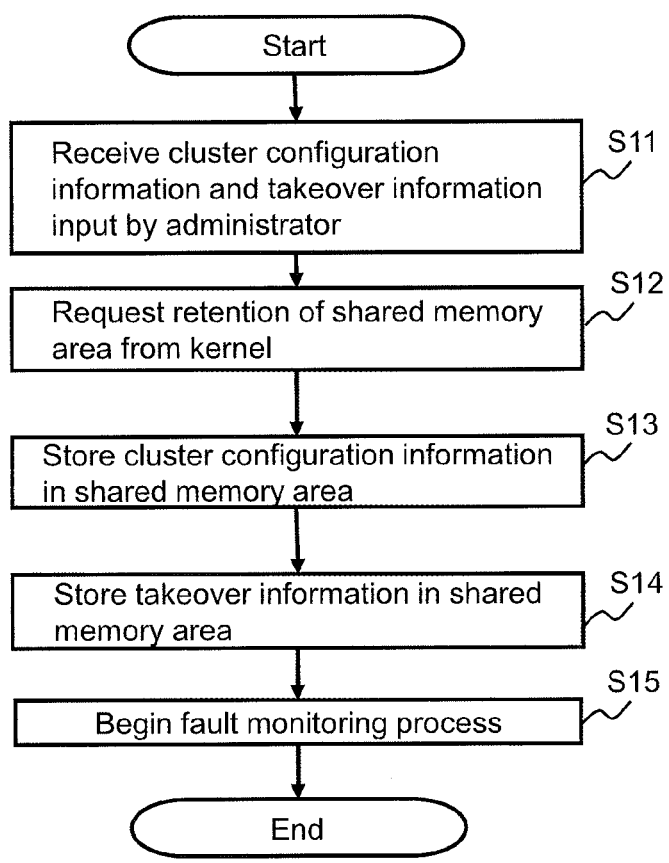
FIG. 11 is a flow chart depicting an initial process.

Firstly, an initial process is described in reference to FIG. 6 and FIG. 11.

FIG. 6 is a pattern diagram of the initial process, while FIG. 11 is a flow chart depicting the initial process.

The management computer 90 sends the received cluster configuration information and takeover information to the LPAR 1 on the converged platform apparatus 10 (FIG. 6(2)) when receiving the input of cluster configuration information and takeover information in regard to the LPAR 1 from the administrator, and receives a cluster configuration request indication (FIG. 6(1)).

A failover program 1 of the LPAR 1 receives the cluster configuration information and the takeover information from the management computer 90 (FIG. 11(S11)), and requests the retention of a shared memory area from the kernel/driver 54 (FIG. 11(S12), FIG. 6(3)). The kernel/driver 54 requests the retention of a shared memory area from the hypervisor 60 (FIG. 6(4)). On receiving a request for the retention of a shared memory area, the hypervisor 60 retains the shared memory area 212 from the memory 21 (FIG. 6(5)).

Once the shared memory area 212 has been retained, the failover program 1 registers cluster configuration information, in the form of the cluster configuration management table 100, to the shared memory area 212 via a kernel/driver 1 ((FIG. 11(S13), FIG. 6(6)), and registers takeover information, in the form of the takeover information management table 110, to the shared memory area 212 (FIG. 11(S14), FIG. 6(6)). At least one of part of the cluster configuration information and part of the takeover information may also be stored on at least one of the LUs 311, either instead of or in addition to the shared memory area 212.

Subsequently the failover program 1 begins the fault monitoring process (see FIG. 8, FIG. 15, FIG. 16, and FIG. 17) (S15)

Figure 7:
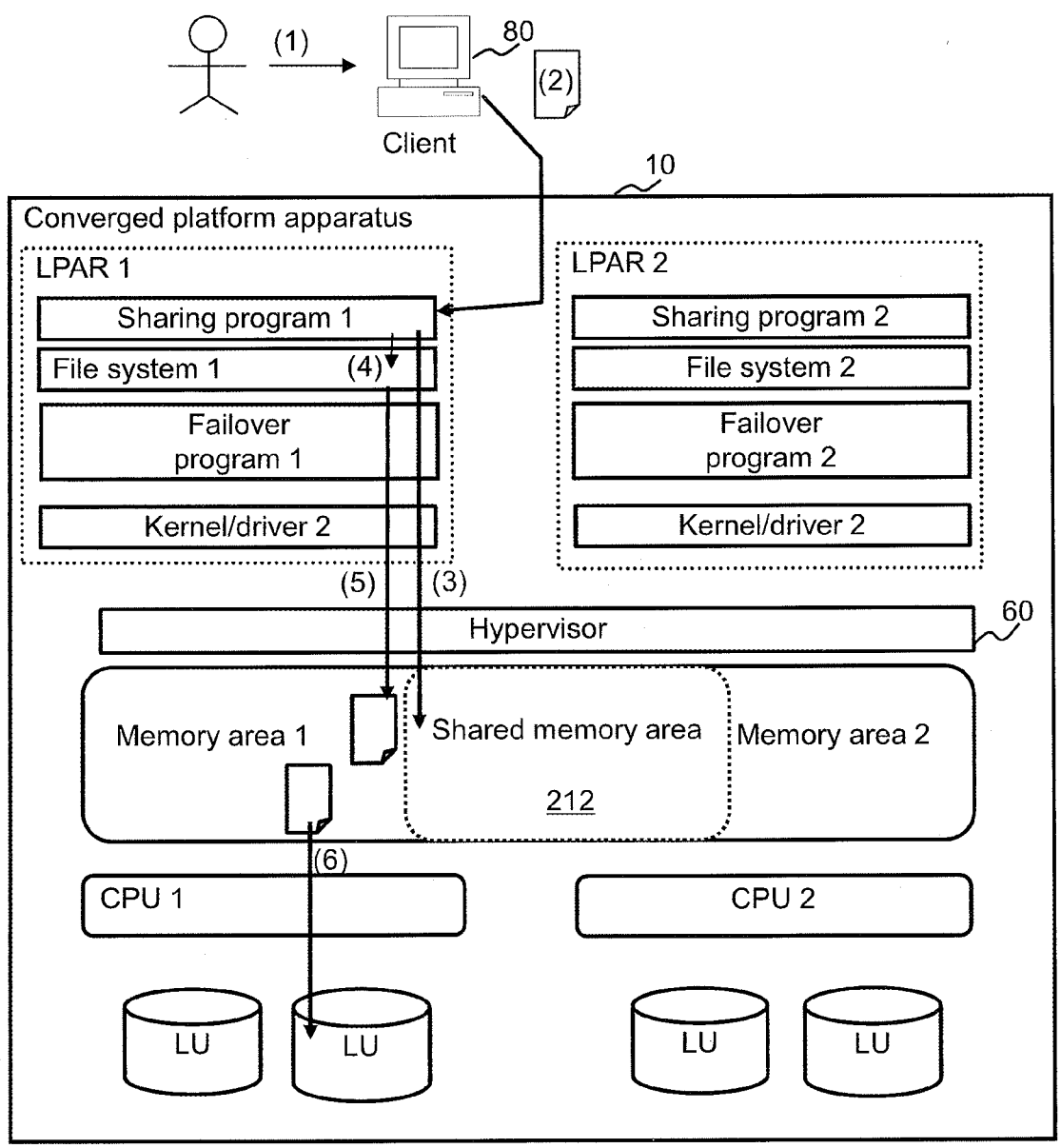
FIG. 7 is a pattern diagram depicting a regular process.
Figure 12:
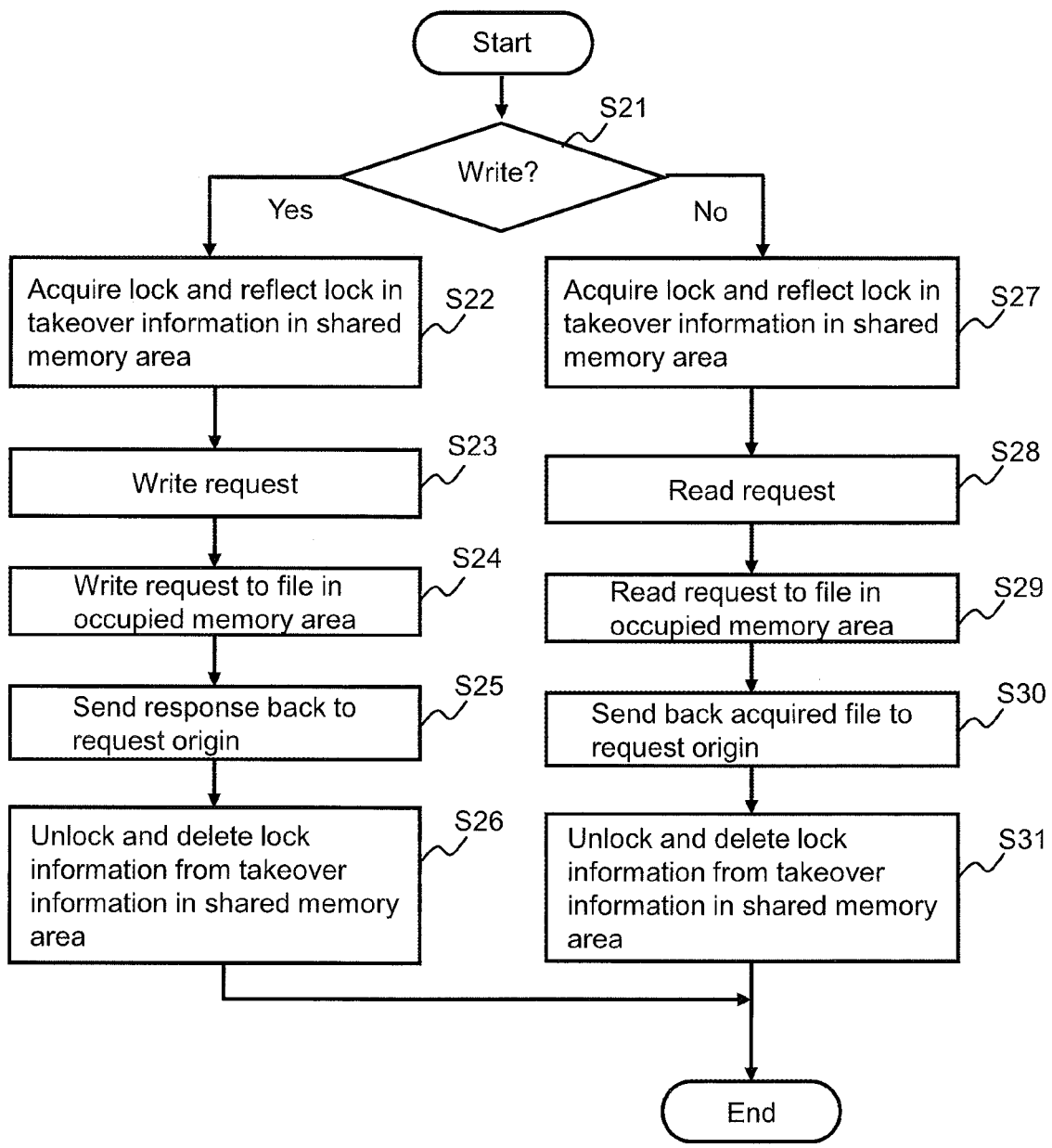
FIG. 12 is a flow chart depicting a file access process.
Figure 13:
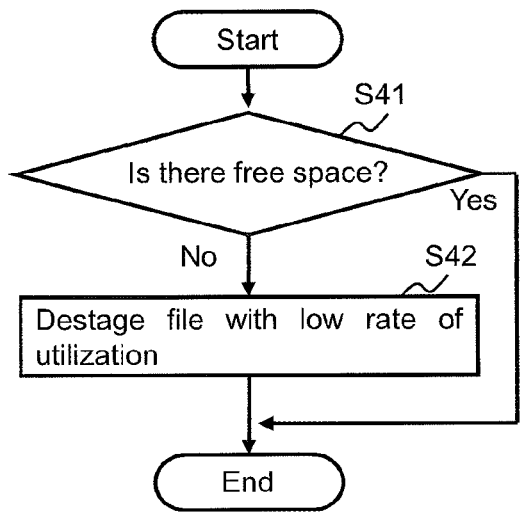
FIG. 13 is a flow chart depicting a destage process.

Next, there follows a description of a regular process which is one of the processes that takes place after the initial process, in reference to FIG. 7, FIG. 12 and FIG. 13.

FIG. 7 is a pattern diagram depicting the regular process; FIG. 12 is a flow chart depicting a file access process; and FIG. 13 is a flow chart depicting a destage process.

When receiving a file access request indication from a user (FIG. 7(1)), the client 80 transmits the file access request received to the LPAR 1 (FIG. 7(2)).

A file sharing program 1 of the LPAR 1 determines whether the file access request is a write request or a read request (S21) when receiving a file access request from the client 80. As a result, if the file access request is a write request (FIG. 12 (S21: Yes)), the file sharing program 1 acquires the lock for the file to be accessed in accordance with the file access request, and reflects the details of the acquired lock in the takeover information management table 110 in the shared memory area 212 (FIG. 12 (S22), FIG. 7(3)). The file sharing program 1 sends a file write request (FIG. 12 (S23), FIG. 7(4)) to a file system 1.

The file system 1 executes the write process in response to the write request for the file in the memory area 1 (occupied memory area 1) (FIG. 12 (S24), FIG. 7(5)). Note that, as shown in FIG. 13, the file system 52 determines whether or not there is sufficient free space in the memory area 1 (FIG. 13 (S41)), and if there is insufficient free space in the memory area 1 (FIG. 13 (S41: No), it destages a file with a low rate of utilization, in other words, writes a file with a low rate of utilization from the memory area 1 to the LU 311 (FIG. 13 (S42), FIG. 7(6)).

After the write process has been executed by the file system 1, the file sharing program 1 sends a response back to the client 80 originating the request (FIG. 12 (S25)), removes the lock, deletes the details of the removed lock from the takeover information management table 110 in the shared memory area 212 (FIG. 12 (S26)), and ends the file access process.

If, on the other hand, the file access request is a read request (FIG. 12 (S21: No)), the file sharing program 1 acquires the lock for the file to be accessed in accordance with the file access request, and reflects the details of the acquired lock in the takeover information management table 110 in the shared memory area 212 (FIG. 12 (S27), FIG. 7(3)). The file sharing program 51 sends a file read request to the file system 52 (FIG. 12 (S28), FIG. 7(4)).

The file system 1 executes the read process in response to the read request for the file in the memory area 1 (occupied memory area 1) (FIG. 12 (S29), FIG. 7(5)).

After the read process has been executed by the file system 1, the file sharing program 1 sends the acquired file back to the client 80 originating the request (FIG. 12 (S30)), removes the lock, deletes the details of the removed lock from the takeover information management table 110 in the shared memory area 212 (FIG. 12 (S31)), and ends the file access process.

The following is a description of the fault monitoring process, in reference to FIG. 8, FIG. 9, FIG. 15, FIG. 16, and FIG. 17.

Figure 8:
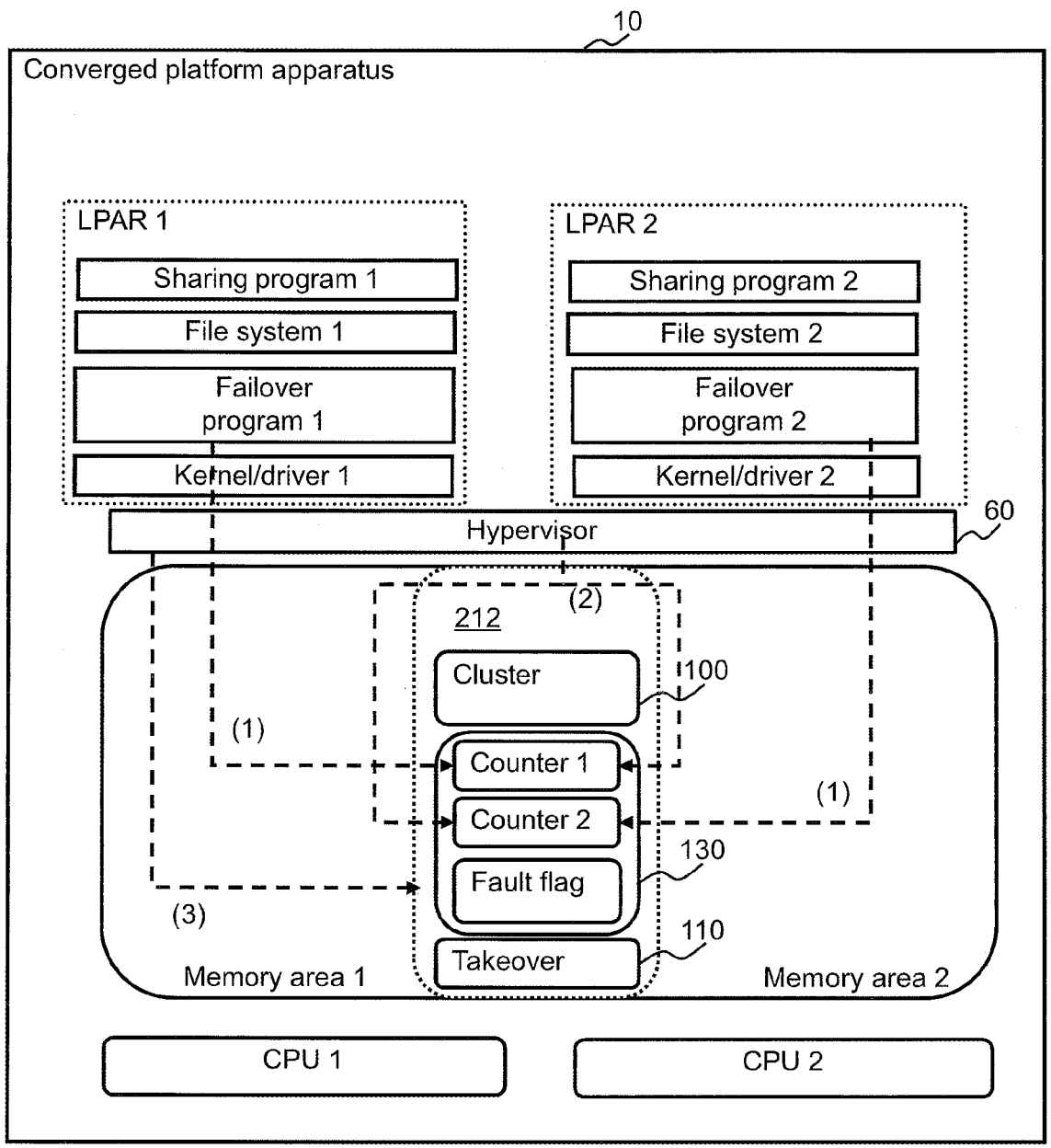
FIG. 8 is a pattern diagram depicting one part of a fault monitoring process.
Figure 9:
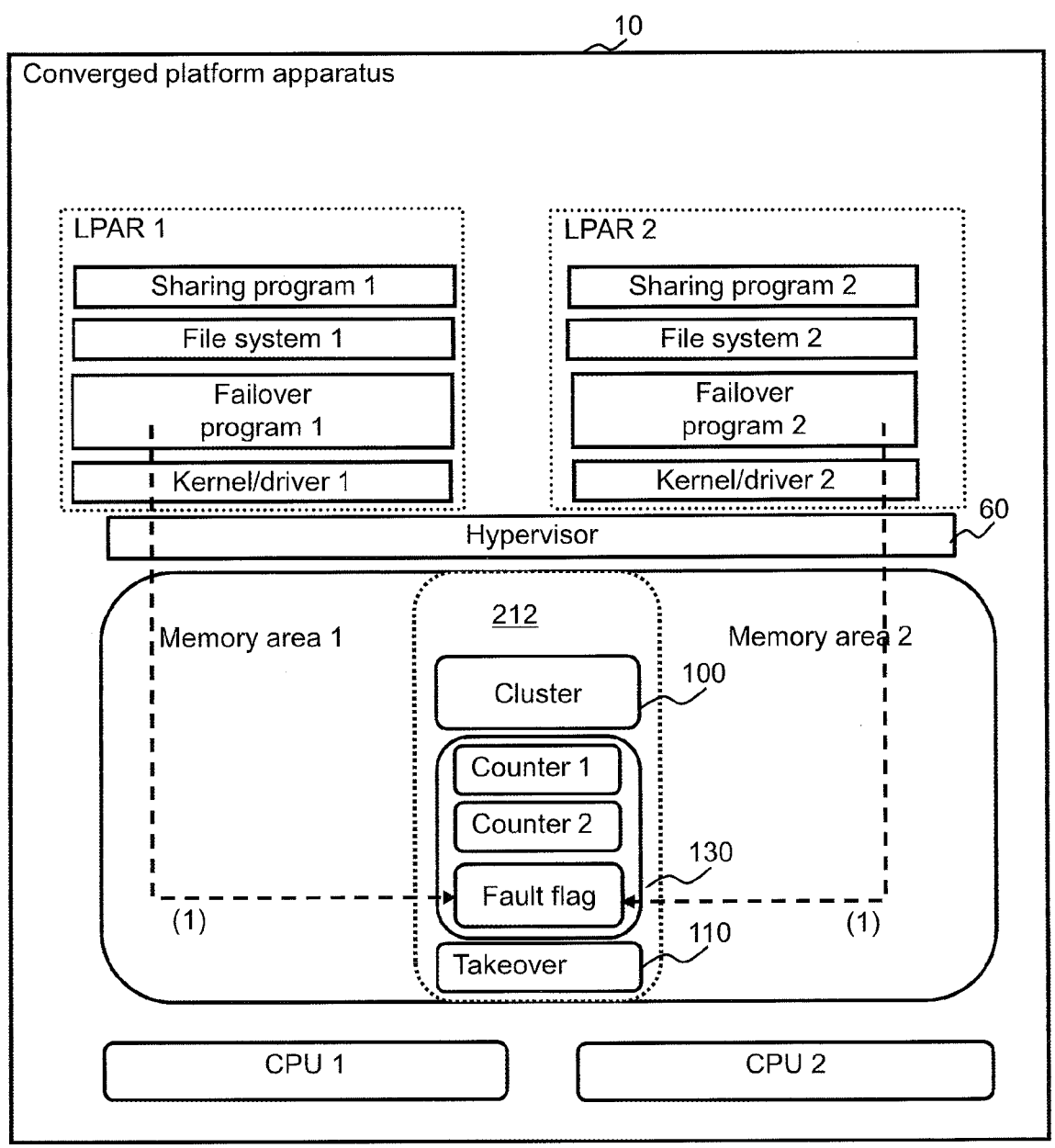
FIG. 9 is a pattern diagram depicting the remaining part of a fault monitoring process.
Figure 15:
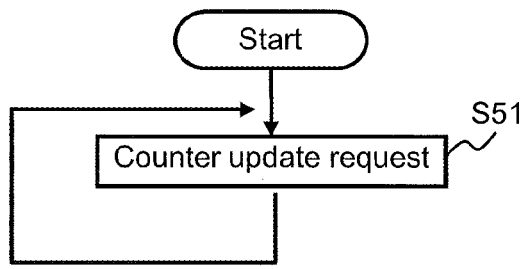
FIG. 15 is a flow chart depicting a counter updating process.
Figure 16:
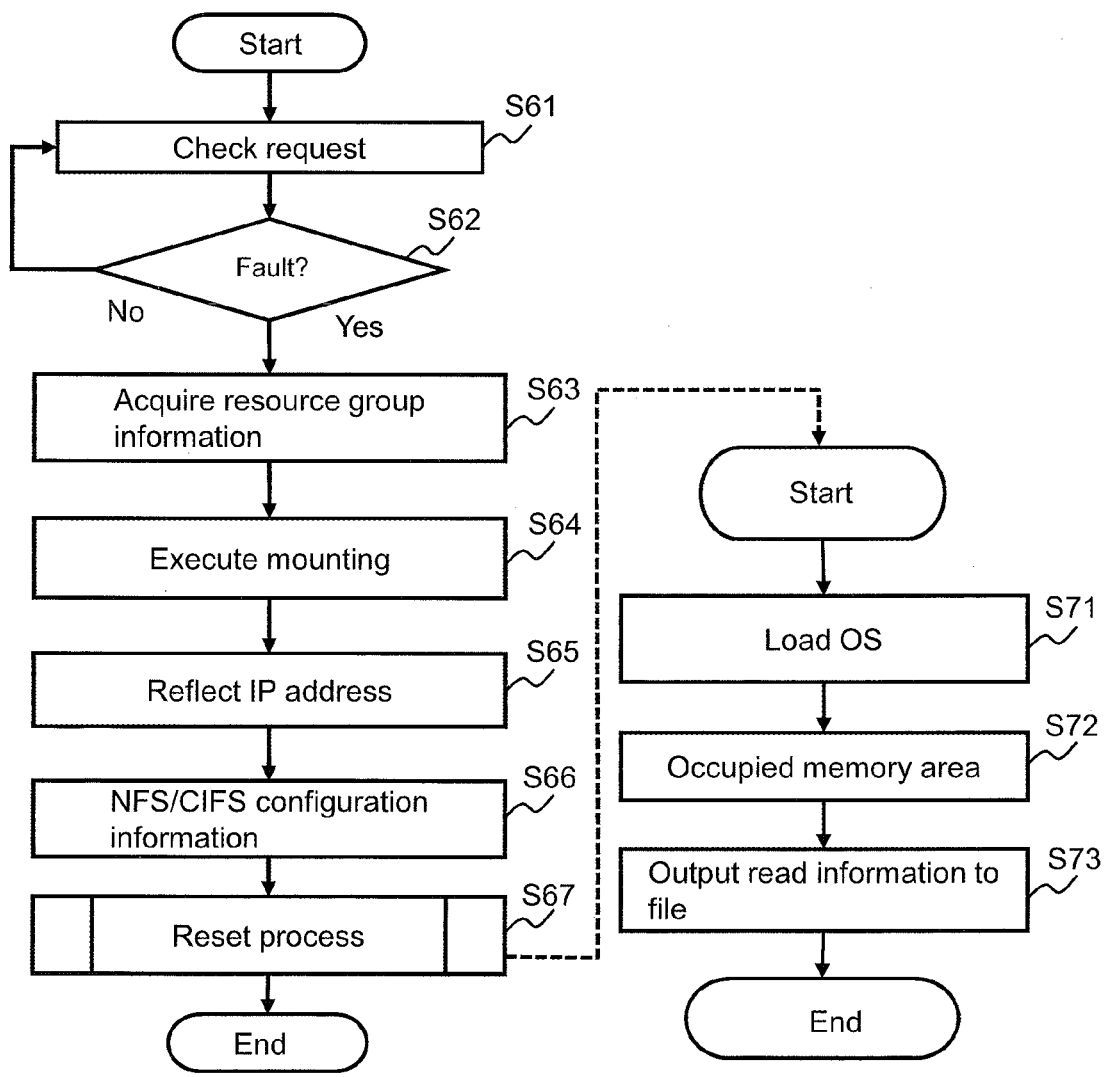
FIG. 16 is a flow chart depicting a fault monitoring process and a failover process.

FIG. 8 is a pattern diagram of part of the fault monitoring process; FIG. 9 is a pattern diagram of the rest of the fault monitoring process; FIG. 15 is a flow chart depicting a counter updating process; FIG. 16 is a flow chart depicting a fault confirmation process and failover process; and FIG. 17 is a flow chart depicting a counter monitoring process.

As shown in FIG. 8, the failover programs 1 and 2 update the counter values corresponding to each LPAR in the fault monitoring management table 120 at the specified intervals of time (FIG. 8(1), FIG. 15(S51)).

Figure 17:
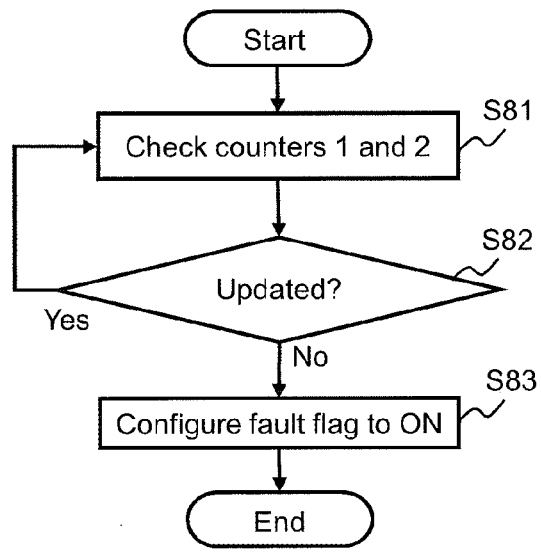
FIG. 17 is a flow chart depicting a counter monitoring process.

At the same time, the hypervisor 60 confirms the counter value corresponding to each LPAR in the fault monitoring management table 120 (FIG. 8(2), FIG. 17 (S81)), and determines whether each counter has been updated within the specified period (FIG. 17 (S82)). As a result, if the counter has been updated (S82: Yes), the hypervisor 60 moves the process to S81, and if it has not been updated (S82: No), the hypervisor 60 configures the value of the fault flag 120c in the fault monitoring management table 120 to ON (FIG. 8(3), FIG. 17 (S83)). This notifies that a fault occurs in the LPAR.

Next, the failover program 1 (2) monitors the value of the fault flag 120c in the fault monitoring management table 120 in the shared memory area 212, via the kernel/driver 1 (2) and hypervisor 60 (FIG. 9(1), FIG. 16 (S61)).

The failover program 1 (2) determines whether or not a fault occurs (S62). Specifically, the failover program 1 (2) determines that a fault occurs if the value of the fault flag 120c in the fault monitoring management table 120 in the shared memory area 212 is ON. As a result, if no fault occurs (FIG. 16 (S62: No)), the failover program 1 (2) moves the process on to S61, while if a fault occurs (S62: Yes), it executes the failover processes (S63 to S67) described below.

Herein, the operation of the computer system is described by way of an example when a fault has occurred.

Figure 14:
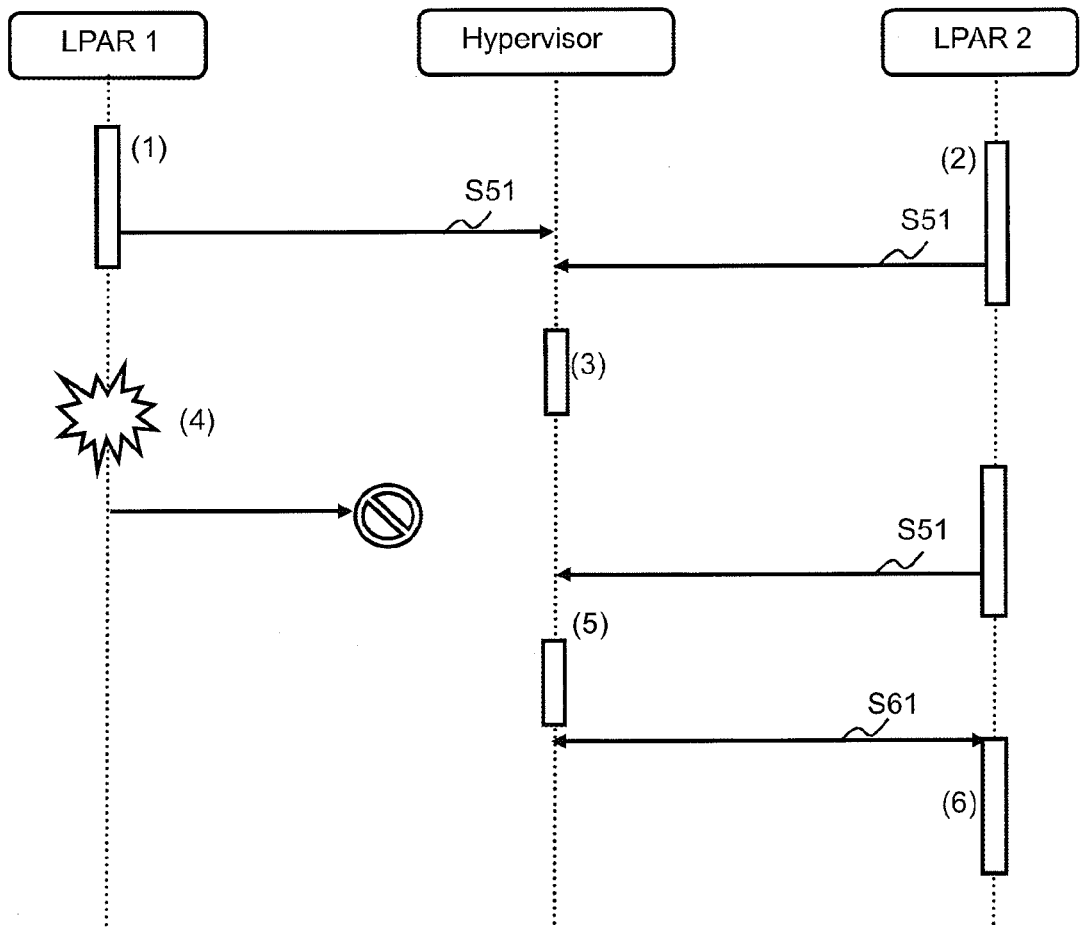
FIG. 14 is a sequence diagram depicting a fault monitoring process and a failover process.

FIG. 14 is a sequence diagram showing the fault monitoring process and failover process.

If no fault occurs in either the LPAR 1 or the LPAR 2, then S51 of the counter update process shown in FIG. 15, takes place, in which the failover program 1 updates a count value 1 (count value of the counter 1 120a) on the fault monitoring management table 120 at the specified intervals of time (FIG. 14(1)), and a failover program 2 updates a count value 2 (count value of the counter 2 120b corresponding to the LPAR 2) on the fault monitoring management table 120 at the specified intervals of time (FIG. 14(2)). As a result, the hypervisor 60 does not configure the value of the fault flag 120c in the fault monitoring management table 120 to ON (FIG. 14(3)) in the counter monitoring process (FIG. 17).

If, however, a fault occurs in the LPAR 1, the failover program 1 becomes unable to update the count value 1 in S51 of the counter update process (FIG. 14(4)). As a result, in the counter monitoring process subsequently implemented (FIG. 17), the fact that the count value 1 has not been updated for a given period is detected, and the value of the fault flag 120*c* on the fault monitoring management table 120 is configured to ON (FIG. 14(5)).

Subsequently, when the failover program 2 of the LPAR 2 executes the fault confirmation process and failover process depicted in FIG. 16, the value of the fault flag 120*c* on the fault monitoring management table 120 is configured to ON. As a result the fact that a fault occurs is determined in S62, and the following failover processes (S63 to S67) are executed (FIG. 14(6)).

Figure 10:
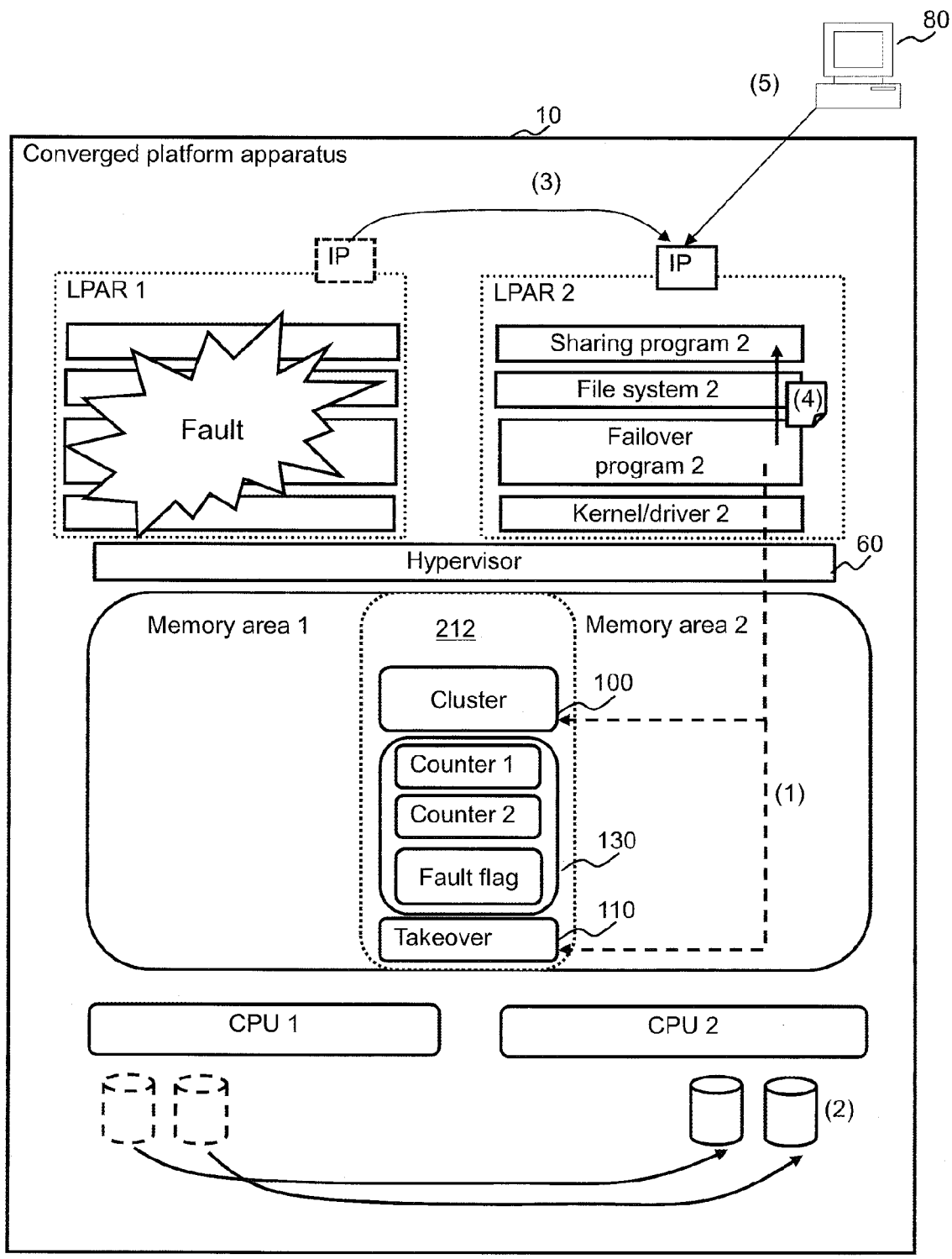
FIG. 10 is a pattern diagram depicting a failover process.

Next, there follows a description of the failover process that takes place if a fault occurs in LPAR, in reference to FIG. 10 and FIG. 16. One LPAR in which the fault has occurred is defined as LPAR 1, while the other LPAR is defined as LPAR 2.

The failover program 2 which detects that a fault has occurred in the LPAR 1, acquires resource group information (specifically, the information configured to the resource group 100*d* on the cluster configuration management table 100) from the cluster configuration management table 100 in the shared memory area 212, via the kernel/driver 2 and the hypervisor 60 (FIG. 10(1), FIG. 16 (S63)). Next, the failover program 2 checks the file system specified from the resource group information, and mounts the file system on the LPAR 2 (FIG. 10(2), FIG. 16 (S64)). In this way, the LPAR 2 becomes able to use the file system used by the LPAR 1.

Next, the failover program 53 configures the IP address included in the resource group information as the IP address of the LPAR 2 (FIG. 10(3), FIG. 16 (S65)). In this way, the LPAR 2 becomes able to receive access requests received by the LPAR 1 from the client 80.

Next, the failover program 2 acquires takeover information (specifically the information configured to the NFS configuration information 110*a*, the CIFS configuration information 110*b*, and the lock information 110*c* in the takeover information management table 110) from the takeover information management table 110 in the shared memory area 212, via the kernel/driver 2 and the hypervisor 60, and configures a file sharing program 2 on the basis of the acquired information (FIG. 10(4), FIG. 16 (S66)), and reopens operation by the file sharing program 2, making it possible to receive access requests from the client 80 (FIG. 10(5)).

In this way, the file sharing program 2 is configured on the basis of information configured to the NFS configuration information 110*a*, the CIFS configuration information 110*b*, and the lock information 110*c*. As a result, the file sharing program 2 is able to provide a file sharing service in the same usage state as that of the file sharing program 1 in the LPAR 1. For example, it is possible to provide, to the client 80 which has published a file system in the LPAR 1, a file sharing service with the same right to access. Furthermore, the lock status resulting from the file system in the LPAR 1 being used can be maintained. As a result, if a certain file is locked as a result of a file access request from a certain client 80, even if a fault has occurred in the LPAR 1, the state of the lock can be taken over by the LPAR 2, preventing the locked file from being occupied by another client 80, and facilitating the continuation of file access by the client 80.

Next, the failover program 2 executes a reset process (FIGS. 16 (S71 to S73) to reset the LPAR 1 where the fault has occurred (FIG. 16 (S64)). It is noted that the reset process is executed in such a way that the data in the memory area 1 of the LPAR 1 where the fault has occurred, is not cleared (deleted).

In the reset process, the failover program 2 loads the OS into an unused area of the memory area 1 in the LPAR 1 where the fault has occurred, and starts up the OS (FIG. 16 (S71)).

Next, the failover program 2 reads the data in the area actually utilized within the memory area 1 in the LPAR 1 where the fault has occurred, via the kernel/driver 2 and hypervisor 60 (FIG. 16 (S72)), and outputs the read data as a file (FIG. 16 (S73)). In this way, the information in the memory area I used by the LPAR 1 where the fault has occurred, can be turned appropriately into a file.

Next, there follows a detailed description of part of the processes in the computer system.

Figure 18:
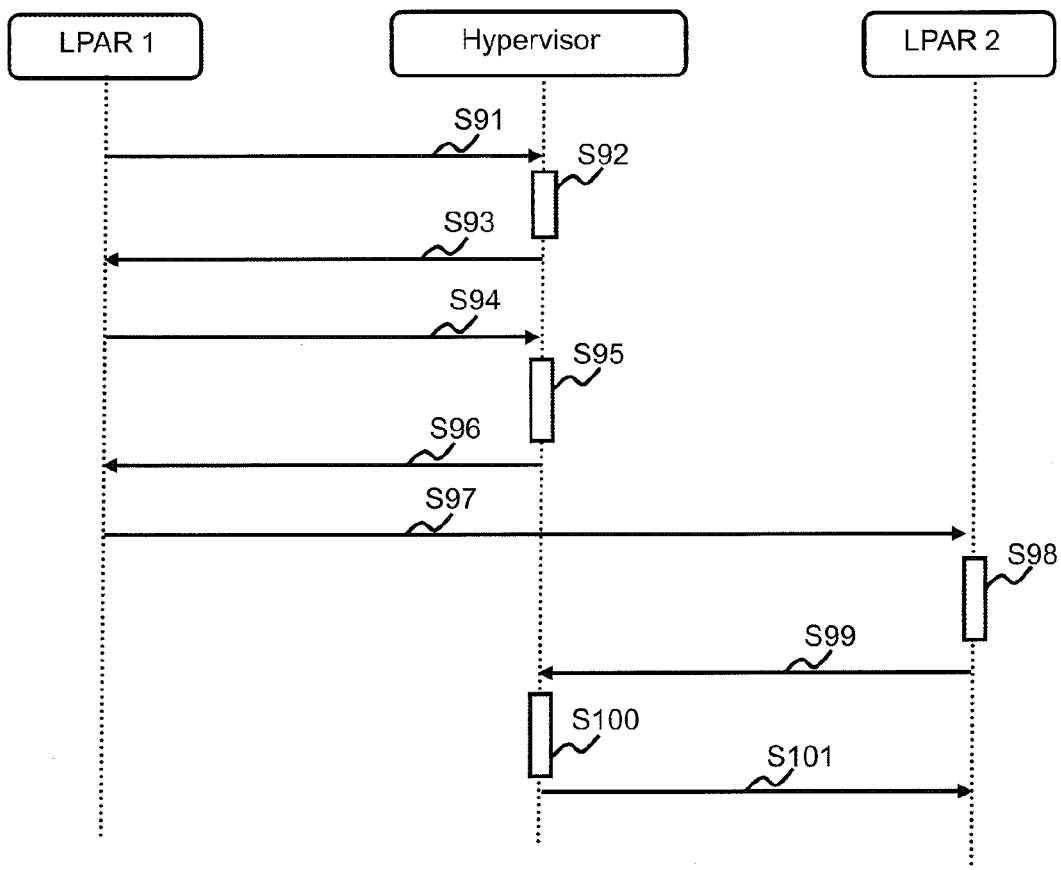
FIG. 18 is a sequence diagram describing access to a shared memory.

FIG. 18 is a sequence diagram describing access to the shared memory area. The sequence depicted in FIG. 18 relates to the processes of S12 through S14 depicted in FIGS. 11, and S63 and S66 in FIG. 16.

First, there follows a description of the processes relating to a process for retaining a shared memory area (S12).

The failover program 1 of the LPAR 1 sends a shared memory area retention request, with the size specified, to the hypervisor 60 (S91). The size specified here takes into consideration, for example, the initial size of the cluster configuration management table 100, the takeover information management table 110, and the fault monitoring management table 120, as well as the increase in size anticipated in the takeover information management table 110, which is expected to increase after operation begins. When receiving a shared memory area retention request, the hypervisor 60 retains an area for a shared memory area 212 having the size in line with the request (S92). Next, the hypervisor 60 transmits a handle to the LPAR 1 in order to allow the shared memory area 212 to be uniquely identified (S93). Here, the handle may contain, for example, the ID of the LPAR 1 that made the shared memory area retention request, and the initial address of the shared memory area 212 within a memory area 21.

Next, there follows a description of the processes related to the process of storing data (S13) to the retained shared memory area 212.

The LPAR 1 transmits a write request, including the received handle, the offset which is the size of the data to be written, and the data, to the hypervisor 60 (S94) when storing data in the shared memory area 212. The hypervisor 60 stores data in the shared memory area 212 in line with the write request (S95), and transmits the results of the write request process to the LPAR 1 (S96).

The LPAR 1 transmits the handle needed to access the shared memory area 212 to the LPAR 2 (S97). The failover program 2 of the LPAR 2 stores the handle needed to access the shared memory area in the memory area 2 of the LPAR 2 (S98). Using the handle, the LPAR 2 is able to appropriately access the retained shared memory area 212.

Next, there follows a description of the processes related to the process in which the LPAR 2 is used to read the data stored in the shared memory area 212 (S63, S66).

If there is a need to read the data from the shared memory area 212 (S63, S66), the failover program 2 of the LPAR 2 transmits a read request including the handle stored in the memory area 2 of the LPAR 2 and the offset which is the size of the data to be read, to the hypervisor 60 (S99). The hypervisor 60 reads the data from the shared memory area 212 in line with the read request (S100) and transmits the read data to the LPAR 2.

In this way, the shared memory area 212 can be retained at a time point when required, and since the LPAR 2 is passed a handle that allows it to identify the shared memory area 212, there is no need to prepare the shared memory area 212 in advance.

Figure 19:
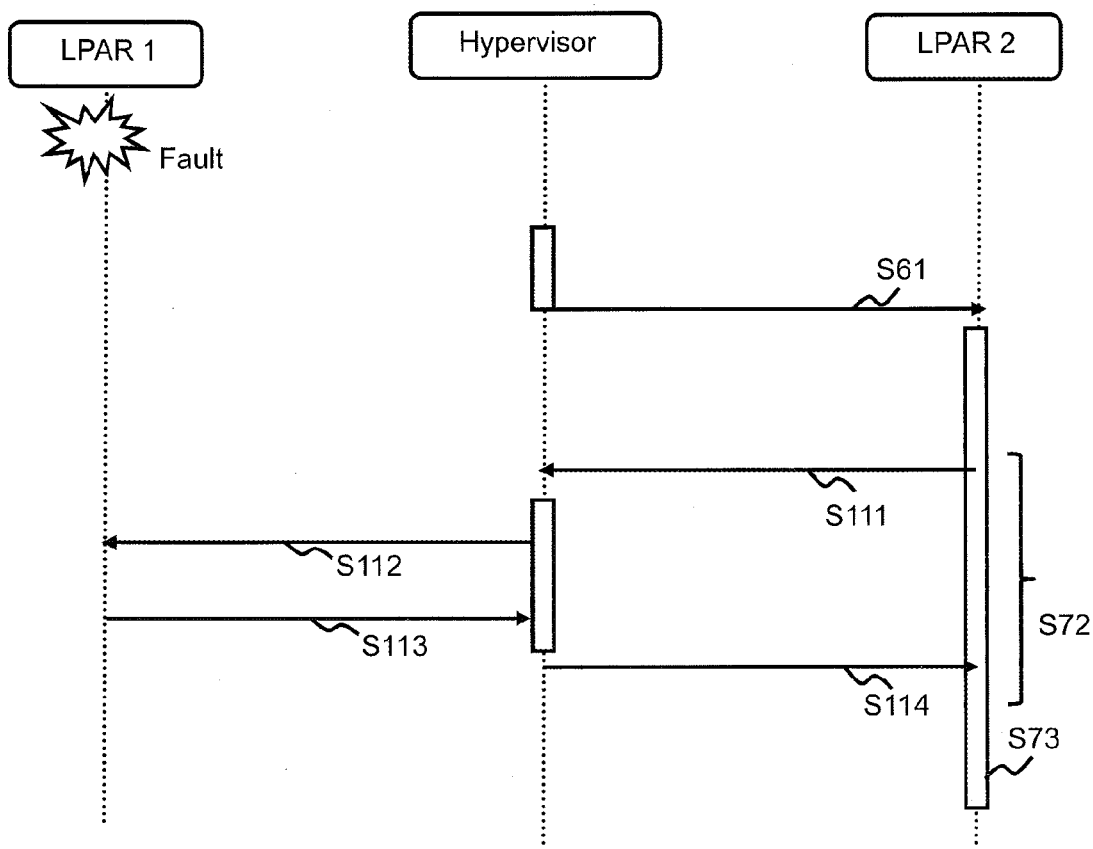
FIG. 19 is a sequence diagram depicting a memory dump process.

FIG. 19 is a sequence diagram depicting a memory dump process. The sequence depicted in FIG. 19 mainly corresponds to the processes for each configuration relating to S72 and S73 in FIG. 16.

In S72, the failover program 2 of the LPAR 2 transmits, to the hypervisor 60, an acquisition request for information on the memory area 1 (occupied memory area 1) of the LPAR 1 (S111). The hypervisor 60 accesses the occupied memory area 1 in line with the acquisition request for information on the occupied memory area 1 information (S112), and acquires the LPAR 1 occupied memory area information (S113). Here, the hypervisor 60 ascertains the state of the memory area 1 of the LPAR 1, and since a fault occurs in the LPAR 1 and the occupied memory area 1 is not in use, can easily acquire the LPAR 1 occupied memory area information without executing exclusive control. Next, the hypervisor 60 returns the acquired occupied memory area information to the LPAR 2 (S114). The failover program 2 of the LPAR 2 which has received the return of the occupied memory area information from the hypervisor 60, writes the occupied memory area information to the PDEV (S73). As a result, even if a fault occurs in the LPAR 1, it is possible to appropriately collect the information on the LPAR 1 occupied memory area 1, and appropriately analyze, etc., the fault.

Although one embodiment is described above, it is needless to say that the present invention is not limited to this embodiment, and that numerous modifications may be made to it without departing from the gist thereof. It is possible, for example, for the hypervisor 60 to directly notify the failover program 53 of another LPAR that a fault has occurred in the LPAR.

REFERENCE SIGNS LIST

10: Converged platform apparatus
20: Server part
30: RAID control part
80: Client
90: Management computer

The invention claimed is:

1. A storage apparatus comprising:
   physical resources including a communication interface coupled to a host apparatus, a memory, and a processor coupled to the communication interface and the memory; and
   a virtualization mechanism configured to manage first and second logical partitions assigned respectively with first and second logical resources acquired by logically partitioning the physical resources,
   wherein the first and second logical partitions are configured each to be able to execute a data input/output process in regard to a storage device,
   wherein the virtualization mechanism is configured to provide a shared memory area which is an area based on the memory and can be accessed by the first and second logical partitions,
   wherein the first logical partition is configured to store information required for taking over a data input/output process handled by the first logical partition to the second logical partition, in the shared memory area,
   wherein the second logical partition is configured to acquire, when detecting that a fault occurs in the first logical partition, the information required for taking over from the shared memory area, and to take over and execute the data input/output process formerly handled by the first logical partition, on the basis of the information required for taking over, and
   wherein the first logical partition is configured to be assigned the shared memory area by the virtualization mechanism, and to write the information required for taking over to the assigned shared memory area.

2. The storage apparatus according to claim 1,
   wherein the virtualization mechanism is configured to monitor whether or not a fault has occurred in the first logical partition, and enable, when a fault has occurred, the second logical partition to recognize that a fault has occurred in the first logical partition.

3. The storage apparatus according to claim 2,
   wherein the first logical partition is configured to write, during normal operation, to the shared memory area, confirmation information indicating that it is operating normally at specified intervals of time, and
   wherein the virtualization mechanism is configured to confirm the confirmation information in the shared memory area to determine whether or not a fault has occurred in the first logical partition.

4. The storage apparatus according to claim 1,
   wherein the first logical partition is configured to transmit, to the second logical partition, a handle capable of identifying the assigned shared memory area, and
   wherein the second logical partition is configured to use the handle to access the shared memory area and acquire the information required for taking over when identifying that a fault has occurred in the first logical partition.

5. The storage apparatus according to claim 1,
   wherein the first logical partition and the second logical partition are configured to access the shared memory area via the virtualization mechanism.

6. The storage apparatus according to claim 1,
   wherein the first logical partition is provided with a file system and is configured to use the file system to execute an input/output process for data in a file requested by the host apparatus, and
   wherein the information required for taking over includes information needed to identify the file system provided by the first logical partition.

7. The storage apparatus according to claim 6,
   wherein the information required for taking over further includes address information needed for the host apparatus to access the file system.

8. The storage apparatus according to claim 7,
   wherein the information required for taking over further includes identification information indicating a host apparatus able to access the file system.

9. The storage apparatus according to claim 8,
   wherein the information required for taking over further includes information indicating a right to access relating to a host apparatus able to access the file system.

10. The storage apparatus according to claim 1,
   wherein the information required for taking over includes information relating to file lock in the file system, and
   wherein the first logical partition is configured to reflect, when receiving an access request in regard to a file from the host apparatus, the information relating to the file lock in the information required for taking over.

11. A failover method, comprising:
   providing first and second logical partitions assigned respectively with first and second logical resources acquired by logically partitioning physical resources including a communication interface coupled to a host apparatus, a memory, and a processor coupled to the communication interface and the memory, with a shared memory area which is an area based on the memory and which can be accessed by the first and second logical partitions;

storing, by the first logical partition, information required for taking over a data input/output process handled by the first logical partition to the second logical partition to takeover, in the shared memory area;

acquiring, by the second logical partition, the information required for taking over from the shared memory area, and, on the basis of the information required for taking over, taking over and executing the data input/output process formerly handled by the first logical partition when detecting that a fault occurs in the first logical partition, and configuring the first logical partition to be assigned the shared memory area by the virtualization mechanism, and to write information required for taking over to the assigned shared memory area.

* * * * *